United States Patent
Takahara et al.

[19]

[11] Patent Number: 6,122,587

[45] Date of Patent: Sep. 19, 2000

[54] VEHICLE DRIVE SYSTEM CONTROLLER AND CONTROL METHOD

[75] Inventors: Hideaki Takahara, Zama; Keiju Abo, Yokohama; Shojiro Kuroda, Sagamihara, all of Japan

[73] Assignee: Nissan Motor Co., Ltd., Yokohama, Japan

[21] Appl. No.: 09/220,347

[22] Filed: Dec. 24, 1998

[30] Foreign Application Priority Data

Dec. 25, 1997 [JP] Japan .................................. 9-358609

[51] Int. Cl.[7] ...................................................... B60K 6/02
[52] U.S. Cl. .............................. 701/78; 701/81; 180/65.4
[58] Field of Search ................................ 701/22, 78, 81, 701/54; 180/65.2, 65.8, 65.4; 303/112, 152

[56] References Cited

U.S. PATENT DOCUMENTS 5,359,308  10/1994  Sun et al. .................................. 335/216
5,450,324   9/1995  Cikanek ..................................... 701/108
5,517,092   5/1996  Adler et al. ................................ 318/60
5,720,690   2/1998  Hara et al. ................................. 477/20
5,788,597   8/1998  Boll et al. .................................. 477/4

FOREIGN PATENT DOCUMENTS

3-79851    4/1991   Japan .
4-297330  10/1992   Japan .
8-251708   9/1996   Japan .

*Primary Examiner*—Michael J. Zanelli
*Attorney, Agent, or Firm*—Foley & Lardner

[57] ABSTRACT

An antilock brake system which decreases a braking pressure to prevent drive wheels from locking is applied to a hybrid vehicle wherein an engine and a motor are connected to the drive wheels via a continuously variable transmission. The rotation torque of a motor is applied to the drive wheels when the braking pressure is reduced due to antilock control so that the engine braking force which acts during braking does not interfere with antilock control.

6 Claims, 9 Drawing Sheets

VEHICLE DRIVE SYSTEM CONTROLLER AND CONTROL METHOD

FIELD OF THE INVENTION

This invention relates to application of an antilock brake system to a vehicle wherein an engine and a motor/generator are connected to drive wheels via a continuously variable transmission.

BACKGROUND OF THE INVENTION

Tokkai Hei 4-297330 published by the Japanese Patent Office in 1992 and Tokkai Hei 8-251708 published by the Japanese Patent Office in 1996 disclose a so-called parallel hybrid vehicle drive system wherein the output torque of an engine and a motor/generator are input to drive wheels via a continuously variable transmission.

In this device, the motor/generator operates as a motor when power is supplied from a battery, and applies a rotation torque to the drive wheels. On the other hand, when a rotation torque is input from the drive wheels, so-called regenerative braking is performed wherein the motor/generator generates power and charges the battery. The drive ratio of the continuously variable transmission, that is the input speed/output speed, varies according to the vehicle speed and throttle opening of the engine.

When the vehicle speed falls due to operation of the brake, the drive ratio of the continuously variable transmission tends towards a maximum drive ratio, and an engine braking force or motor/generator regenerative braking force depending on the increasing drive ratio acts on the drive wheels together with the braking force of the brake.

In such a vehicle, when an antilock braking system (ABS) is applied to prevent locking of the drive wheels during braking, an engine braking force or regenerative braking force is acting even when the braking force is limited by the antilock control, so the braking force tends to become excessive.

SUMMARY OF THE INVENTION

In Tokkai Hei 3-79851 published by the Japanese Patent Office in 1991, a device is disclosed for preventing excessive increase of engine braking force or regenerative braking force by maintaining the drive ratio of the continuously variable transmission during antilock braking in the vicinity of a minimum drive ratio. Using this device, when braking is continued, the vehicle stops while the drive ratio is held in the vicinity of the minimum drive ratio. Since the drive ratio of the continuously variable transmission cannot be changed when the drive wheels have stopped, the vehicle restarts in the vicinity of the minimum drive ratio. In this case, as when starting in top gear in the case of a vehicle provided with a manual transmission, it is difficult to apply a suitable starting torque to the drive wheels.

It is therefore an object of this invention to maintain the effectiveness of antilock braking without impairing the starting performance of a vehicle.

In order to achieve the above objects, this invention provides a controller for a vehicle drive system wherein an engine and a motor are connected to a drive wheel via a continuously variable transmission which increases a drive ratio according to a decrease of a rotation speed of the drive wheel.

The vehicle comprises an accelerator pedal for increasing an output torque of the engine according to a depression thereof, while the engine exerts an engine brake on the drive wheel when the accelerator pedal has been released, a brake device for applying a braking pressure to the drive wheel, and an antilock brake system which decreases the braking pressure so as to prevent the drive wheel from locking.

The controller comprises a microprocessor programmed to control the drive system so that the rotation torque of the motor is applied to the drive wheel when the antilock brake system is decreasing the braking pressure.

This invention also provides a control method for the aforesaid vehicle drive system. The method comprises the steps of determining if the antilock brake system is decreasing the braking pressure, and applying the rotation torque of the motor to the drive wheel when the antilock brake system is decreasing the braking pressure.

The details as well as other features and advantages of this invention are set forth in the remainder of the specification and are shown in the accompanying drawings.

DESCRIPTION OF THE PREFERRED EMBODIMENTS

Figure 1:
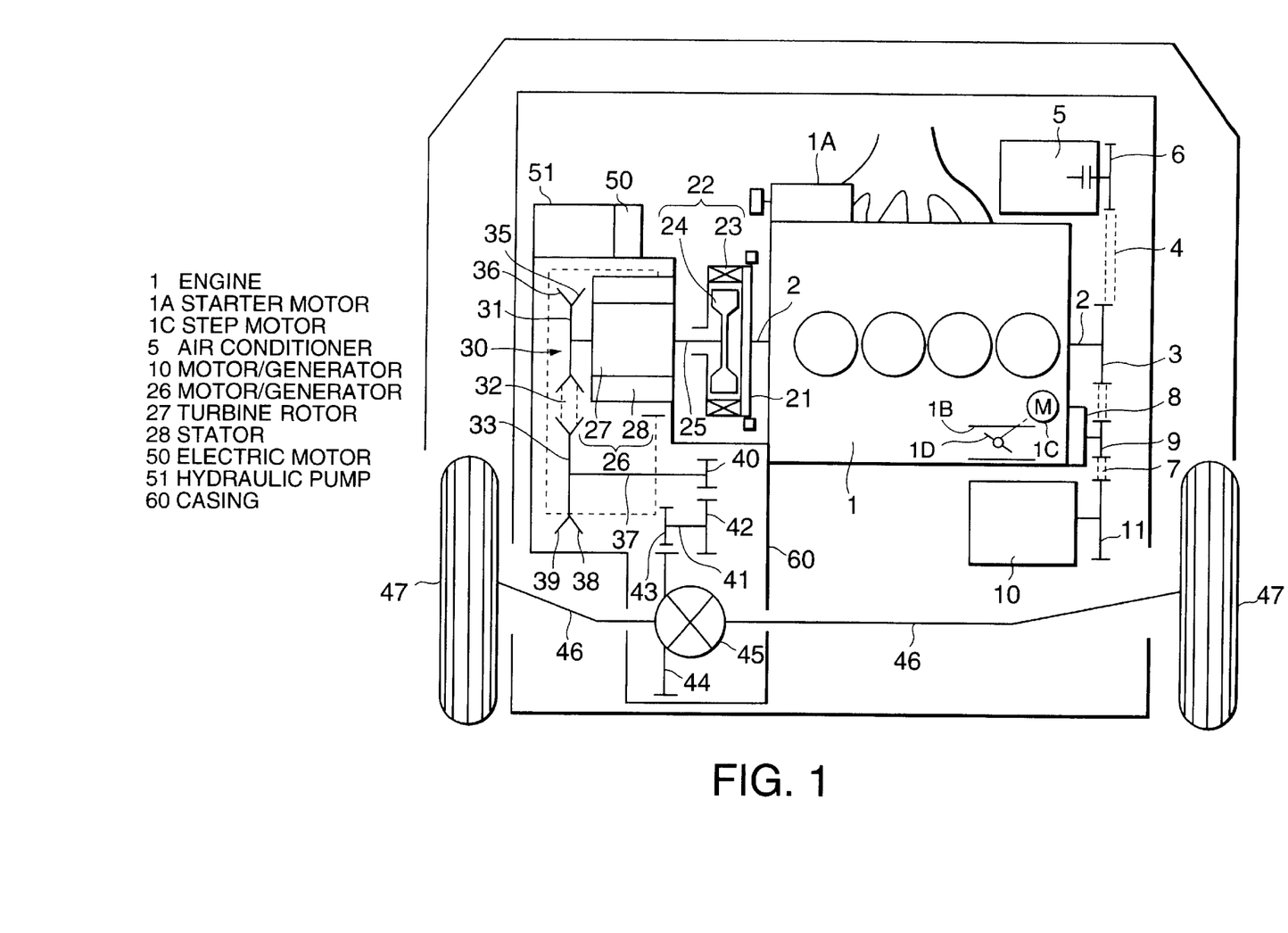
FIG. 1 is a schematic diagram of a vehicle drive system to which this invention is applied.

Referring to FIG. 1 of the drawings, a vehicle applying this invention is provided with a parallel hybrid drive system comprising a gasoline engine 1 started by a starter motor 1A, two motor/generators 10 and 26, and a continuously variable transmission 30.

One end of a crankshaft 2 of the engine 1 is connected to a crank pulley 3. The crank pulley 3 drives a pulley 6 of an air-conditioner 5 via an auxiliary belt 4. It also drives a pulley 9 of a water pump 8 and a pulley 11 of the 3-phase induction motor/generator 10 via another auxiliary belt 7.

The motor/generator 10 functions as a motor when supplied with power from a battery, not shown, when the engine 1 has stopped, and drives the air-conditioner 5. When the engine 1 is operating, the motor/generator 10 functions as a generator for charging a battery 71 shown in FIG. 2, as well as for supplying power to accessories.

The other end of the crankshaft 2 of the engine 1 is connected to a drive member 23 of an electromagnetic power clutch 22 via a flywheel 21. The drive member 23 is a ring-shaped part holding an electromagnetic coil.

A driven member 24 of the power clutch 22 is supported free to rotate by a drive shaft 25.

The drive shaft 25 is joined to a rotor 27 of the 3-phase induction motor/generator 26. The 3-phase induction motor/generator 26 comprises a stator 28 having plural magnetic poles with coil windings facing the rotor 27.

The drive shaft 25 is joined to the V-belt continuously variable transmission 30. The continuously variable transmission 30 comprises a primary pulley 31 joined to one end of the drive shaft 25, and a secondary pulley 33 joined to the primary pulley 31 via a V-belt 32.

The primary pulley 31 comprises a fixed wheel 35 and a movable wheel 36, a V-shaped pulley groove around which the V-belt is looped being formed by these wheels. The width of the pulley groove varies due to the axial displacement of the movable wheel 36 according to oil pressure.

The secondary pulley 33 likewise comprises a fixed wheel 38 and movable wheel 39, and the V-belt is looped around the V-shaped pulley groove formed between the wheels. A rotation shaft 37 of the fixed wheel 38 is joined to a drive gear 40. The drive gear 40 engages with an idler gear 42 supported free to rotate via an idler shaft 41. A pinion 43 fixed to the same idler shaft 41 engages with a final gear 44. The final gear 44 drives drive wheels 47 via a differential gear unit 45 and drive shaft 46.

The motor/generator 26 and the continuously variable transmission 30 are housed in a casing 60 with a set of gears ranging from the drive gear 40 to the final gear 44.

Figure 2:
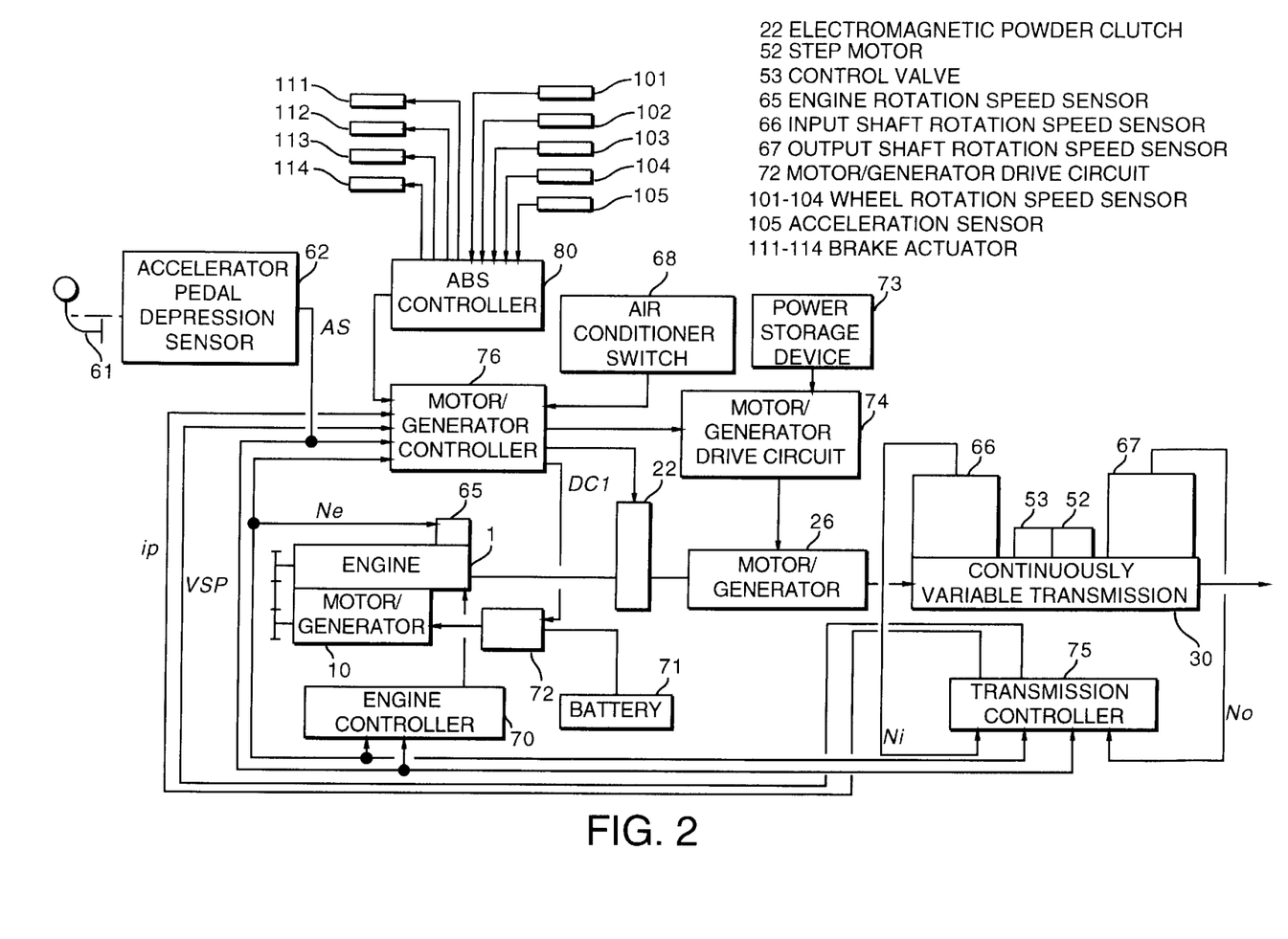
FIG. 2 is a block diagram showing the construction of a controller according to this invention.

An oil pump 51 driven by an electric motor 50 is provided outside the casing 60. Oil pressure produced by the oil pump 51 is used to drive the movable wheels 36 and 39 of the primary pulley 31 and secondary pulley 33 via a speed change control valve 53 which is shown in FIG. 2. The oil pressure pump 51 also supplies lubricating oil to various parts in the casing 60. The speed change control valve 53 is controlled via a step motor 52.

Next, referring to FIG. 2 of the drawings, the motor/generator 26, the engine 1 and the continuously variable transmission 30 are respectively controlled by a motor/generator controller 76, engine controller 70 and transmission controller 75. These controllers respectively comprise microcomputers having a central processing unit (CPU), read-only memory (RAM), random access memory (ROM), and input/output interfaces (I/O interfaces).

This vehicle comprises an accelerator pedal 61 so that the driver can input an acceleration command.

An accelerator pedal depression amount sensor 62 is attached to the accelerator pedal 61. The accelerator pedal depression amount sensor 62 detects a depression amount AS of the accelerator pedal 61, and outputs a corresponding signal to the aforesaid three controllers.

An engine rotation speed sensor 65 attached to the engine 1 detects an engine rotation speed Ne, and inputs a corresponding signal to the aforesaid three controllers.

An input shaft rotation speed sensor 66 which detects the rotation speed of the primary pulley 31 and an output shaft rotation speed sensor 67 which detects the rotation speed of the secondary pulley 33 are attached to the continuously variable transmission 30. The input shaft rotation speed and output shaft rotation speed detected by these rotation speed sensors 66, 67 are input as signals to the transmission controller 75.

The engine 1 has an electronic throttle 1D which increases or decreases the intake air amount of an intake passage 1B, as shown in FIG. 1. The electronic throttle 1D is driven by a step motor 1C, and the throttle opening of the electronic throttle 1D is controlled by a signal output by the engine controller 70 to the step motor 1C. Therefore, the output torque of the engine 1 varies according to the output signal of the engine controller 70.

The motor/generator 10 is connected to a rechargeable battery 71 via a motor/generator drive circuit 72, as shown in FIG. 2. The motor/generator drive circuit 72 comprises a chopper and an inverter. The motor/generator controller 76 operates the motor/generator 10 as either a motor or generator by outputting a signal to the motor/generator drive circuit 72. The voltage of the battery 71 is 12V. When the engine 1 is running, the motor/generator 10 functions as a generator. To control the motor/generator 10, a signal indicating the operating state of the air conditioner 5 is input to the motor/generator controller 76 from an air conditioner switch 68 of the air conditioner 5.

The motor/generator 26 is connected to a power storage device 73 via a motor/generator drive circuit 74. The motor/generator drive circuit 74 comprises a chopper and inverter. The motor/generator controller 76 operates the motor/generator 26 as either a motor or generator by a signal output to the motor/generator drive circuit 74. The power storage device 73 comprises a 345V rechargeable battery and a condenser. The motor/generator controller 76 also controls the electromagnetic power clutch 22 so as to be engaged or released.

The transmission controller 75 controls a drive ratio of the continuously variable transmission 30 by a signal output to the step motor 52.

Figure 3:
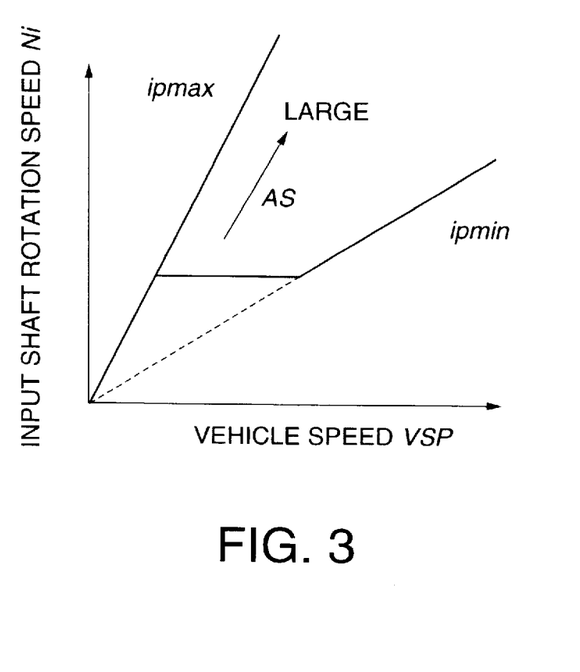
FIG. 3 is a diagram describing a variation of a speed change ratio of a continuously variable transmission with which the vehicle drive system is provided.

The transmission controller 75 computes a vehicle speed VSP from an output shaft rotation speed No detected by the output shaft rotation speed sensor 67, and sets a target drive ratio by looking up a speed change pattern control map shown in FIG. 3 based on an input shaft rotation speed Ni detected by the input shaft rotation speed sensor 66, the accelerator pedal depression amount AS detected by the accelerator depression amount sensor 62, and the vehicle speed VSP.

Specifically, the target drive ratio increases the more the vehicle speed VSP decreases, increases the larger the accelerator pedal depression amount AS, and increases the higher the engine rotation speed Ne.

A real drive ratio ip is also computed based on the input shaft rotation speed Ni and output shaft rotation speed No, and the step motor 52 is feedback controlled so that the real drive ratio ip coincides with the target drive ratio.

The speed change control valve 53 driven by the step motor 52 varies the oil pressure applied to the movable wheels 36, 39 of the continuously variable transmission 30, and varies the contact radius of the V-belt with the pulleys 31, 33. In this way, the drive ratio of the continuously variable transmission 30 is varied. In this description, the drive ratio is defined as Ni/No.

This vehicle further comprises an antilock brake system (ABS) which controls the braking pressure so that wheel lock does not occur during braking. A wheel cylinder for braking is attached to each of the vehicle wheels, and each wheel is braked by brake actuators 111–114 supplying oil pressure to the wheel cylinders according to a depression of a brake pedal, not shown. At this time, the ABS controls the braking pressure supplied by the brake actuators 111–114 so that a slip factor of each wheel is a predetermined value.

For this purpose, the antilock brake system comprises wheel speed sensors 101–104 which detect the rotation speeds of the drive wheels 47 and non-drive wheels, not shown. The rotation speeds of the wheels detected by the wheel speed sensors 101–104 are input as signals to an ABS controller 80. The antilock brake system further comprises an acceleration sensor 105 which detects an acceleration in the front/back direction of the vehicle. The detection signal from the acceleration sensor 105 is also input to the ABS controller 80.

The ABS controller 80 estimates a real vehicle speed Vx from the rotation speed of the wheels and the vehicle acceleration. A slip factor for each wheel is then calculated from this real vehicle speed Vx and the rotation speed of each wheel. The pressure supplied to the wheel cylinder of each wheel from the brake actuators 111–114 is controlled so that the slip factor of each wheel is, for example, 15%.

The aforesaid antilock brake control is known from Tokkai Hei 9-249112 published by the Japanese Patent Office in 1996.

The ABS controller 80 outputs the rotation speeds $V_{FR}$, $V_{FL}$ of the left and right drive wheels 47 and the estimated vehicle speed Vx, which were respectively obtained in the above process, to the motor /generator controller 76. The ABS controller 80 also outputs signals corresponding to a control flag FABS and a pressure reduction flag FL to the motor/generator controller 76.

Here, the control flag FABS may take a value of either 0 or 1. When FABS=1, it shows that the pressure of the wheel cylinder of at least one of the drive wheels 47 is being controlled by the ABS controller 80. When FABS=0, it shows that there is no wheel cylinder of the drive wheels 47 whereof the pressure is controlled by the ABS controller 80.

The pressure reduction flag FL may also take a value of either 0 or 1. When FL=1, it shows that at least one wheel cylinder of the drive wheels 47 is in a pressure reduction state. The pressure reduction state includes both the case when the pressure is being reduced, and when low pressure is being maintained after pressure reduction. When FL=0, it shows that the wheel cylinders of both the left and right drive wheels 47 are not in the pressure reduction state.

In addition to these signals, the accelerator pedal depression amount AS, real drive ratio ip computed by the transmission controller 75, vehicle speed VSP, engine rotation speed Ne, and throttle opening TVO set by the engine controller 70, are input as signals to the motor /generator controller 76. Based on these signals, the motor /generator controller 76 controls the motor /generator drive circuits 72, 74 and electromagnetic power clutch 22. Command signals which command the engine 1 to start and stop are also output to the engine controller 70 from the motor/generator controller 76.

Next, referring to the flowcharts of FIGS. 4 and 6, the control process of the motor/generator 26 performed by the motor /generator controller 76 via the motor/generator drive circuit 74 will be described. This process is performed at a timer interrupt interval of, for example, 10 milliseconds.

First, in a step S1, the motor/generator controller 76 reads the accelerator pedal depression amount AS and vehicle speed VSP.

In a step S2, it is determined whether or not the accelerator pedal depression amount AS is 0, i.e. whether or not the accelerator pedal is released.

When the accelerator pedal depression amount AS is not 0, the routine proceeds to a step S3. In the step S3, it is determined which of the following four regions the vehicle running state corresponds to by looking up a running pattern control map shown in FIG. 5.

Figure 5:
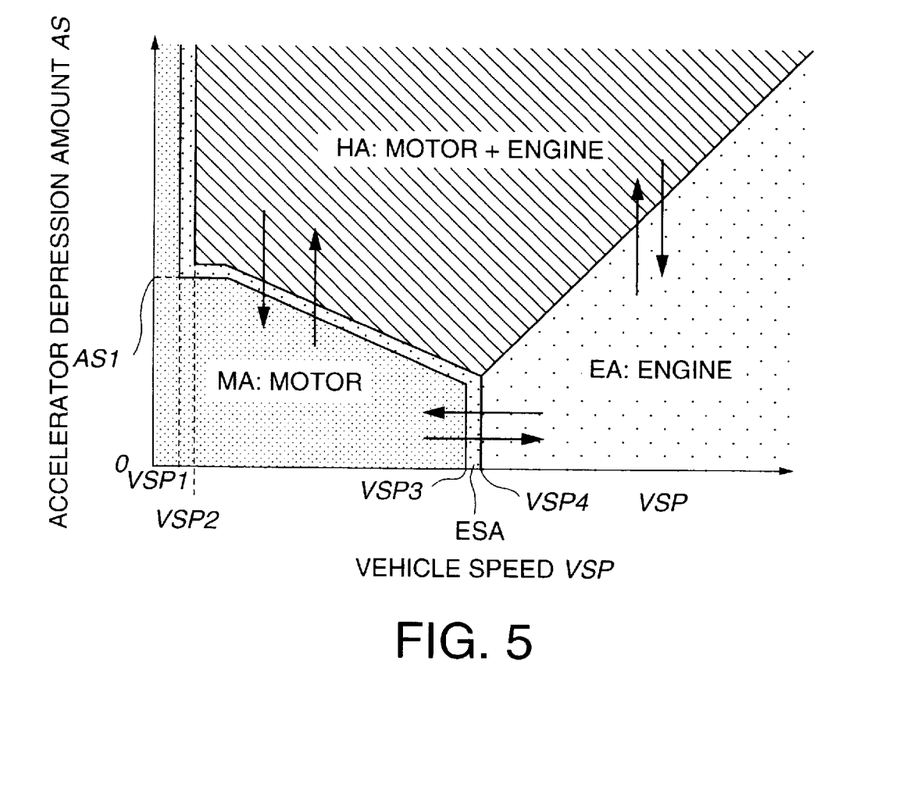
FIG. 5 is a diagram describing the contents of a running pattern map stored by the controller.

A motor running region MA is a region where the vehicle runs only under the output of the motor/generator 26.

An engine running region EA is a region where the vehicle runs only under the output of the engine 1.

A hybrid running region HA is a region where the vehicle usually runs under the output of the engine 1, but uses the motor /generator 26 during acceleration.

An engine starting region ESA is a region which exists at the boundary between the motor running region MA and the surrounding regions EA, HA, and it starts the engine 1.

These regions are preset according to the vehicle speed VSP and accelerator pedal depression amount AS as shown in FIG. 5, and are stored as a map by the motor /generator controller 76. In the step S3, the engine 1, motor /generator 26 and electromagnetic power clutch 22 are controlled according to the determined running region, and the routine is then terminated. The processing of the step S3 is performed as a subroutine.

During this subroutine, the electromagnetic power clutch 22 is engaged or released depending on the following conditions. Specifically, when the running state shifts from the motor running region MA to the engine start region ESA and the engine 1 starts, the electromagnetic power clutch 22 is engaged when the engine rotation speed Ne is equal to the input shaft rotation speed Ni of the continuously variable transmission 30, i.e. the rotation speed of the motor/ generator 26. On the other hand, when the engine running state shifts from the engine running region EA or hybrid running region HA to the motor running region MA, the electromagnetic power clutch 22 is released when the accelerator pedal depression amount AS exceeds a predetermined value or the vehicle stops.

In this subroutine, even when the running state is the motor running region MA, when the charge amount of the power storage device 73 is low, the engine 1 starts, and the motor/generator 26 is operated as a generator so as to charge the power storage device 73.

When the accelerator pedal depression amount AS is 0 in the step S2, it is determined whether or not the vehicle speed VSP is 0, i.e. whether or not the vehicle has stopped, in a step S4. When VSP=0, the routine proceeds to a step S5.

In the step S5, the electromagnetic power clutch 22 is released by for example outputting a clutch control signal CL having a logical value=0 to the electromagnetic power clutch 22.

In the following step S6, it is determined whether or not the air conditioner switch 68 is ON, and if it is OFF, the process is terminated without proceeding to subsequent steps.

When the air conditioner switch 68 is ON, a high-level drive control signal DC which drives the motor/generator 10 as a motor is output to the motor/generator drive circuit 72 in a step S7, and the routine is terminated.

On the other hand, when the vehicle speed VSP is not 0 in the step S4, the routine proceeds to a step S8. As can be seen from the steps S2 and S6, the routine proceeds to the step S8 when the accelerator pedal 61 is not depressed and the vehicle is running.

Figure 6:
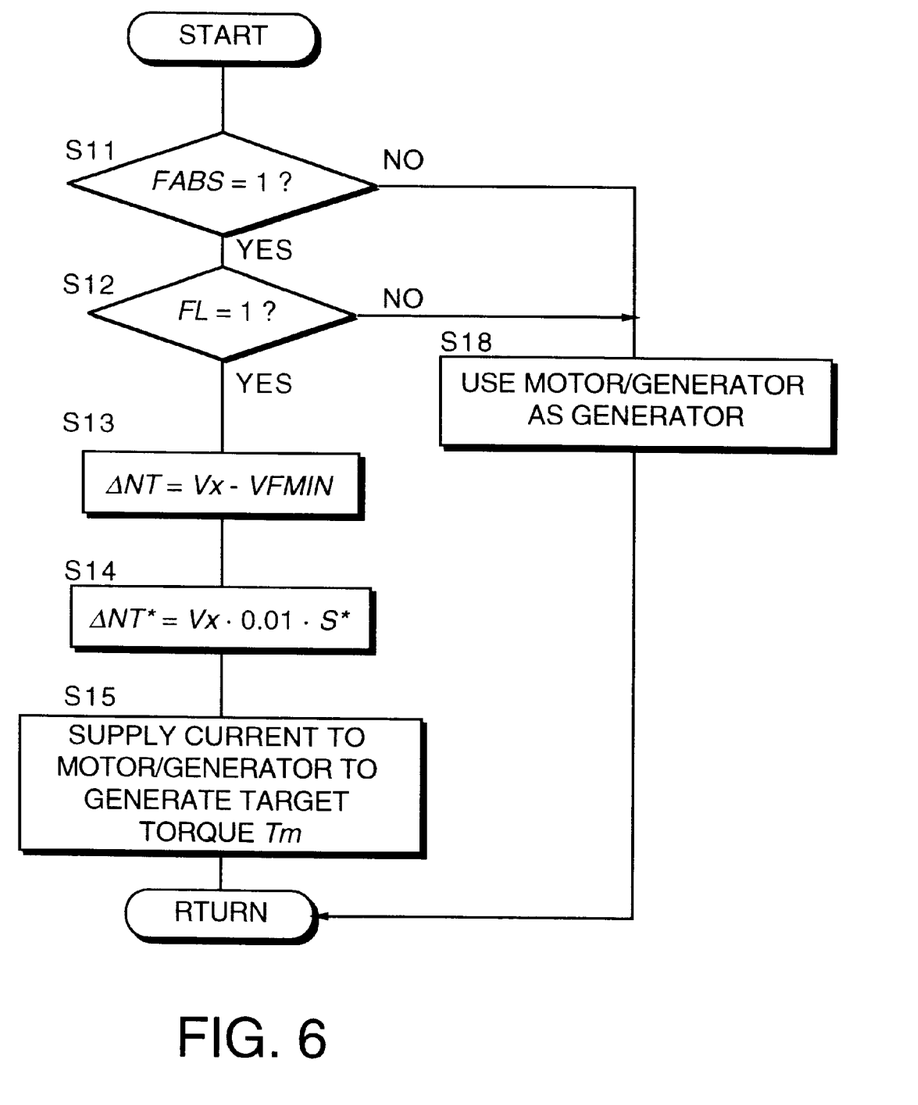
FIG. 6 is a flowchart describing a subroutine used by the process of FIG. 4.

In the step S8, the motor /generator drive circuit 74 is controlled by a subroutine shown in FIG. 6, and the routine is terminated.

In the subroutine, firstly in a step S11, it is determined whether or not the control flag FABS input from the ABS controller 80 is 1. When FABS=1, it means that antilock brake control is being applied to at least one of the drive wheels 47.

In this case, the subroutine proceeds to a step S12, and it is determined whether or not the pressure reduction flag FL is 1. When FL=1, it means that the braking pressure is being reduced for at least one of the drive wheels. In this case, the subroutine proceeds to a step S13.

In the step S13, the wheel speeds $V_{FR}$, $V_{FL}$ input from the ABS controller 80 and the estimated vehicle speed Vx are read. A real speed difference $\Delta NT$ is then calculated from a value $V_{FMIN}$ which is the smaller of the wheel speeds $V_{FR}$, $V_{FL}$ and the estimated vehicle speed Vx by the following equation (1):

$$\Delta NT = Vx - V_{FMIN} \quad (1)$$

Next, in a step S14, a target speed difference $\Delta NT^*$ to achieve the aforesaid slip factor $S^*$ at the estimated vehicle speed Vx is calculated by the following equation (2). 0.01 in the equation is a conversion coefficient to convert the slip factor $S^*$ which is expressed as a percentage, to a decimal value:

$$\Delta NT^* = Vx - 0.01 \cdot S^* \quad (2)$$

Figure 7:
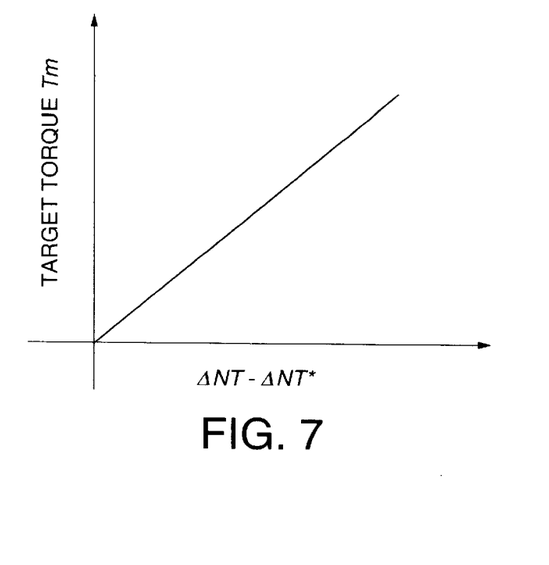
FIG. 7 is a diagram describing the contents of a motor drive torque map stored by the controller.

Next, in a step S15, a torque Tm which should be supplied to the motor/generator 26 is calculated by looking up a map whereof the contents are shown in FIG. 7, based on the deviation between the real speed difference $\Delta NT$ and the target speed difference $\Delta NT^*$. As can be seen from the diagram, the supply torque Tm obtained from the map also increases the larger the deviation, i.e. the larger the real slip factor. The motor/generator controller 76 also calculates a target value of the current load on the motor/generator 26 required for the motor/generator 26 to generate the torque Tm by looking up a map, not shown, from the obtained torque Tm. A current equal to this target value is then supplied to the motor/generator 26 via the motor/generator drive circuit 74, and the subroutine is terminated. On the other hand, when the control flag FABS is 0 in the step S11, or the pressure reduction flag FL is 0 in the step S12, the subroutine proceeds to the step S18. Herein, the motor/generator controller 76 uses the motor/generator 26 as a generator, therefore a motor/generator power is calculated based on running conditions by looking up a preset energy recovery amount computing map. A chopper command value and a command signal to use the motor/generator 26 as a generator are output to the motor/generator drive circuit 74 to obtain this power.

After this processing is completed, the motor/generator controller 76 terminates the subroutine.

Next, the variation of braking force and drive ratio according to the above process will be described.

Firstly, the wheel cylinder pressure control performed by the ABS controller 80 will be described referring to FIGS. 8A–8D. When the vehicle is running and the driver operates the brake at a time t1, supply pressure to the wheel cylinder sharply increases and the wheel speed begins to drop. When the deceleration of the wheel exceeds a predetermined threshold value at a time $t_2$, the pressure increase of the wheel cylinder stops, and the routine shifts to a high pressure hold mode. When the wheel speed falls below the target wheel speed shown by the dotted line at a time $t_3$, ABS control begins, the aforesaid ABS control flag FABS is set to 1, and wheel cylinder depressurizing is performed. As a result, the wheels change over from deceleration to acceleration, and when the wheel acceleration exceeds a threshold value at a time $t_4$, the ABS controller 80 stops depressurizing the wheel cylinder and shifts to a low pressure hold mode. When the wheel speed exceeds the target wheel speed at a time $t_5$, the ABS controller 80 begins to increase the wheel cylinder pressure. Due to the pressure increase of the wheel cylinder, the wheels again begin to decelerate.

Figures 8A, 8B, 8C, 8D:
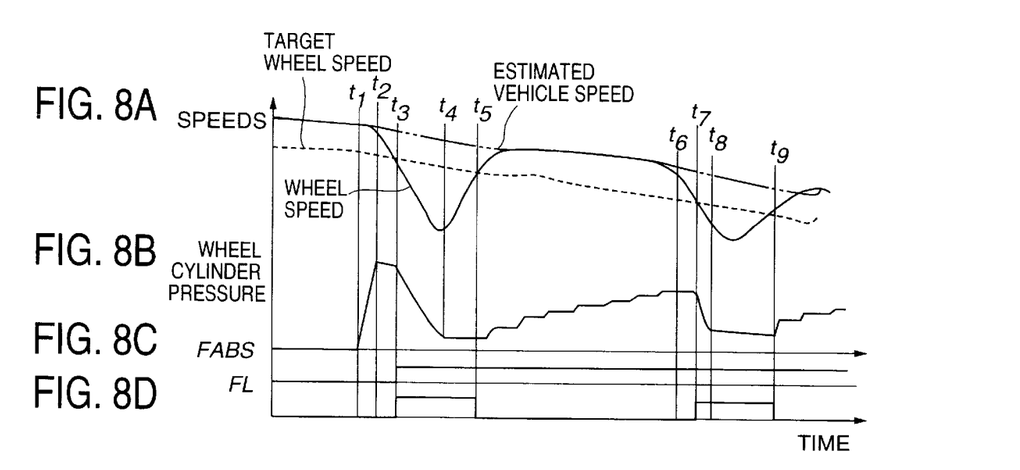
FIGS. 8A–8D are timing charts describing the variation of drive wheel speed and braking pressure according to the antilock brake system used in conjunction with the vehicle drive system.

As a result, when the wheel deceleration exceeds a threshold value at a time $t_6$, the ABS controller 80 stops increasing the wheel cylinder pressure, and shifts to the high pressure hold mode. When the wheel speed falls below the target wheel speed at a time $t_7$, the ABS controller 80 again begins to the depressurize the wheel cylinder. In this way, the ABS controller 80 increases and decreases the wheel cylinder pressure so that the average wheel speed coincides with the target wheel speed corresponding to the aforesaid slip factor.

As a result of the above control, the ABS control flag FABS remains set at 1 from the time $t_3$ to when ABS control is terminated as shown in FIG. 8C. Further, the depressurizing flag FL is set to 1 in the interval $t_3$–$t_5$ and the interval $t_7$–$t_9$, and is reset to 0 in other intervals.

At the same time, the transmission controller 75 increases the drive ratio of the continuously variable transmission 30 as the vehicle speed drops in accordance with the predetermined speed change pattern. The engine braking force also increases due to the increase of drive ratio.

Figure 4:
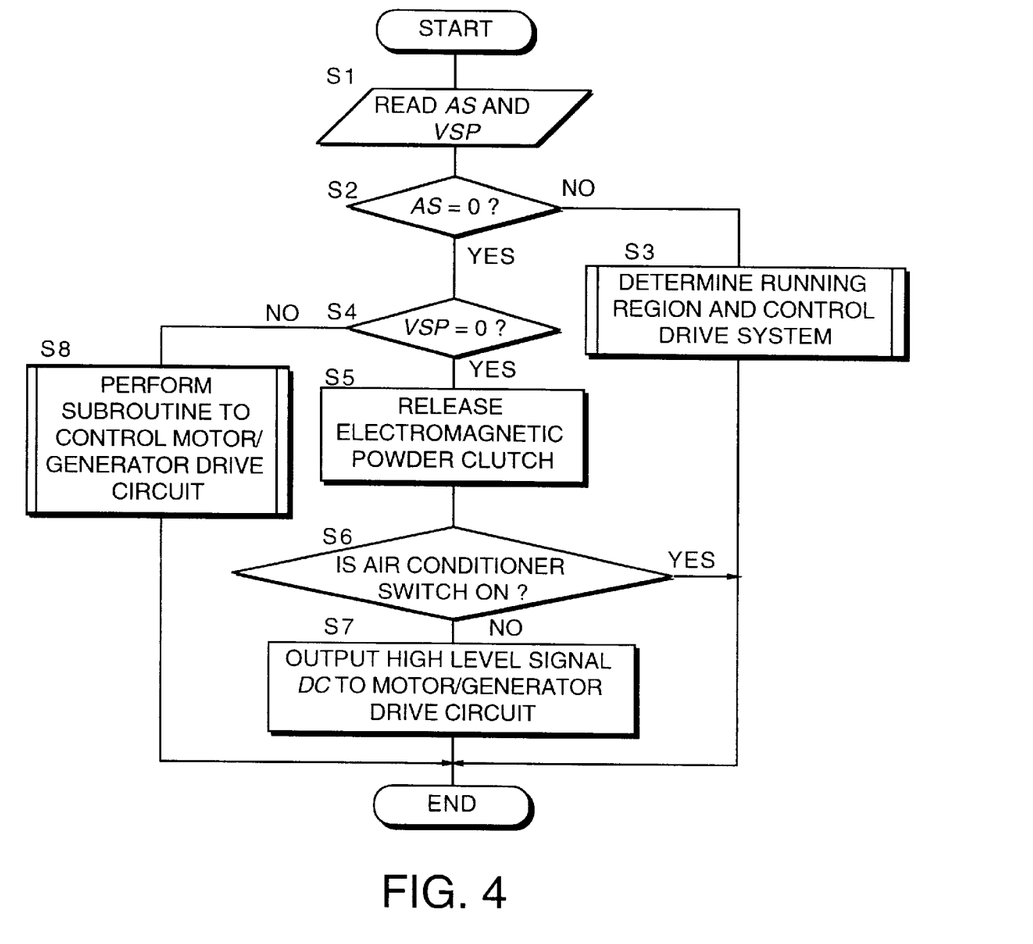
FIG. 4 is a flowchart describing a control process of a motor/generator performed by the controller.

In the above braking state, in the routine of FIG. 4 performed by the motor/generator controller 76, since the accelerator pedal 61 is not depressed and the running speed is not 0, the processing of the step S8, i.e. the subroutine of FIG. 6, is performed at a predetermined interval.

Consequently, in the interval $t_1$–$t_3$ and the interval $t_5$–$t_7$ when the ABS control flag FABS is 0 or the depressurizing flag FL is 0, the processing of the step S18 is applied, and the motor/generator 26 functions as a generator. Due to this, part of the running energy is converted to electrical energy, and charging of the storage device 73 is performed. The energy consumed by this generator has the same effect on the vehicle as the engine brake. This function is referred to as regenerative braking. During this interval, the estimated vehicle speed is effectively equal to the wheel speed $V_{FMIN}$, and there is little possibility of the wheels locking even if the engine braking force increases.

On the other hand, in the interval $t_3$–$t_5$ and the interval $t_7$–$t_9$ when the ABS control flag FABS and the depressurizing flag FL are both 1, the processing of the steps S13–S15 is performed in the subroutine of FIG. 6.

As a result, the motor/generator 26 applies a rotation torque to the drive wheels according to the deviation between the real speed difference $\Delta NT$ and the target speed difference $\Delta NT^*$.

In the intervals $t_3$–$t_5$ and $t_7$–$t_9$, the wheel speed drops considerably due to the increase of braking and drive ratio, however excessive drop of wheel speed and locking of the wheels is prevented because the motor/generator 26 applies a rotation torque to the drive wheels to counter this.

The motor/generator controller 76 performs the above control even when only one drive wheel is depressurizing or in the depressurizing hold mode, and the other drive wheel is in a pressure increase or pressure increase hold mode. In this case, the braking force of the other drive wheel falls, and this tends to work to synchronize the braking of the left and right drive wheels.

The transmission controller 75 also varies the drive ratio toward the maximum drive ratio as the vehicle speed falls due to braking.

However, the increase of engine braking force due to this drive ratio variation is canceled out by the rotation torque which the motor/generator 26 applies to the drive wheels in functioning as a motor. Therefore, wheel lock does not occur, and the vehicle is restarted smoothly after it has stopped under a large drive torque due to the maximum drive ratio or a drive ratio in its vicinity.

Next, a second embodiment of this invention will be described referring to FIGS. 9 to 11.

Figure 9:
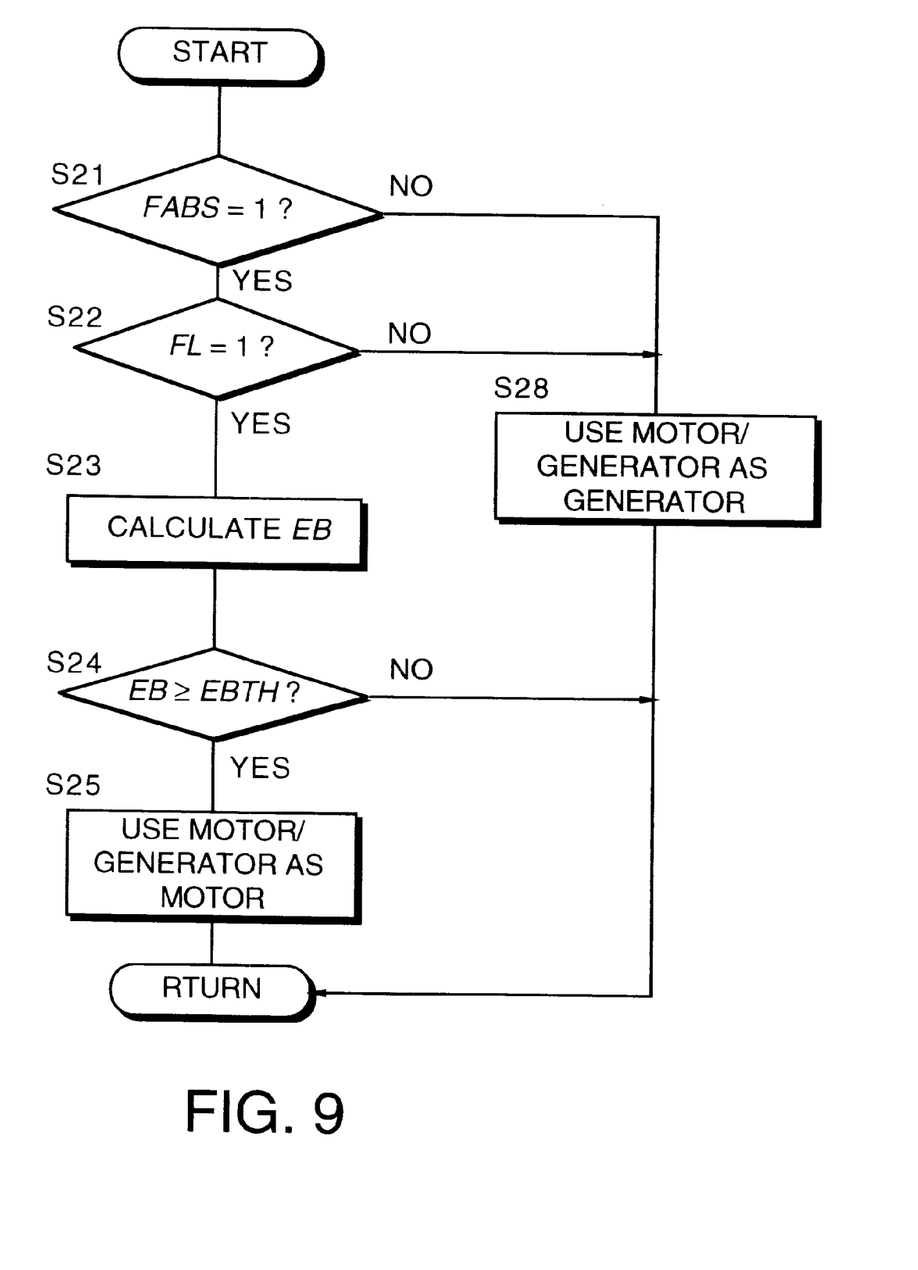
FIG. 9 is similar to FIG. 6, but showing a second embodiment of this invention.
Figure 10:
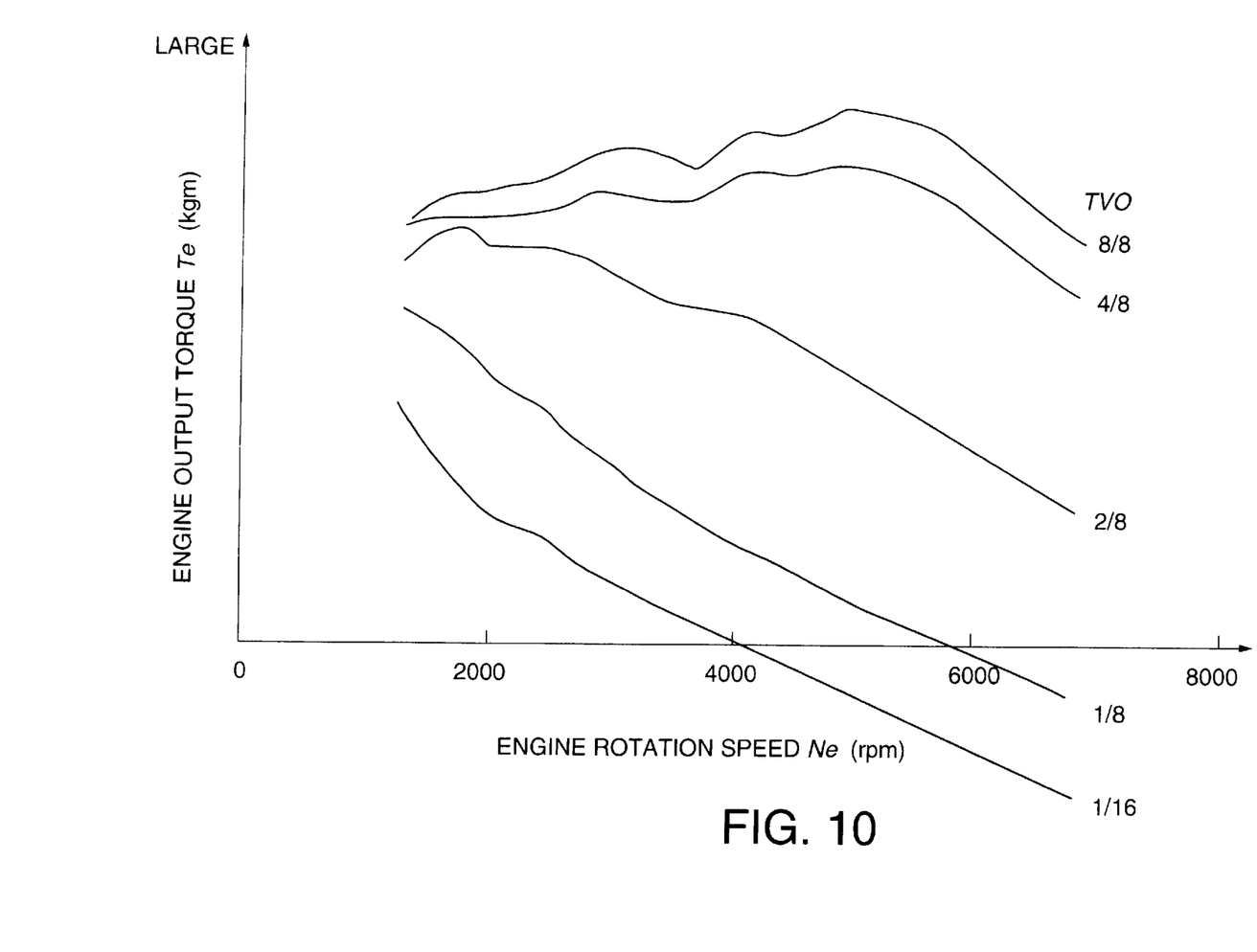
FIG. 10 is a diagram describing the contents of an engine output torque computing map stored by the controller according to the second embodiment.

In this embodiment, the subroutine shown in FIG. 9 is used instead of the subroutine of FIG. 6 which was applied in the first embodiment.

Steps S21, S22 and S28 of this subroutine are equivalent to the steps S11, S12 and S18 of the first embodiment.

In the step S22, when the pressure reduction flag FL is 1, the motor/generator controller 76 performs the following processing in a step S23. Specifically, the engine output torque Te is found by looking up a map shown in FIG. 10 based on the engine rotation speed Ne and throttle opening TVO input from the engine controller 70.

As shown in this map, the output torque Te when the vehicle is coasting, i.e. running without the accelerator pedal depressed and without applying the brakes, becomes negative. In this context, when the output torque Te is a negative value, its absolute value is set as a coasting torque Tec. When the output torque Te is zero or positive, the coasting torque Tec is 0.

Figure 11:
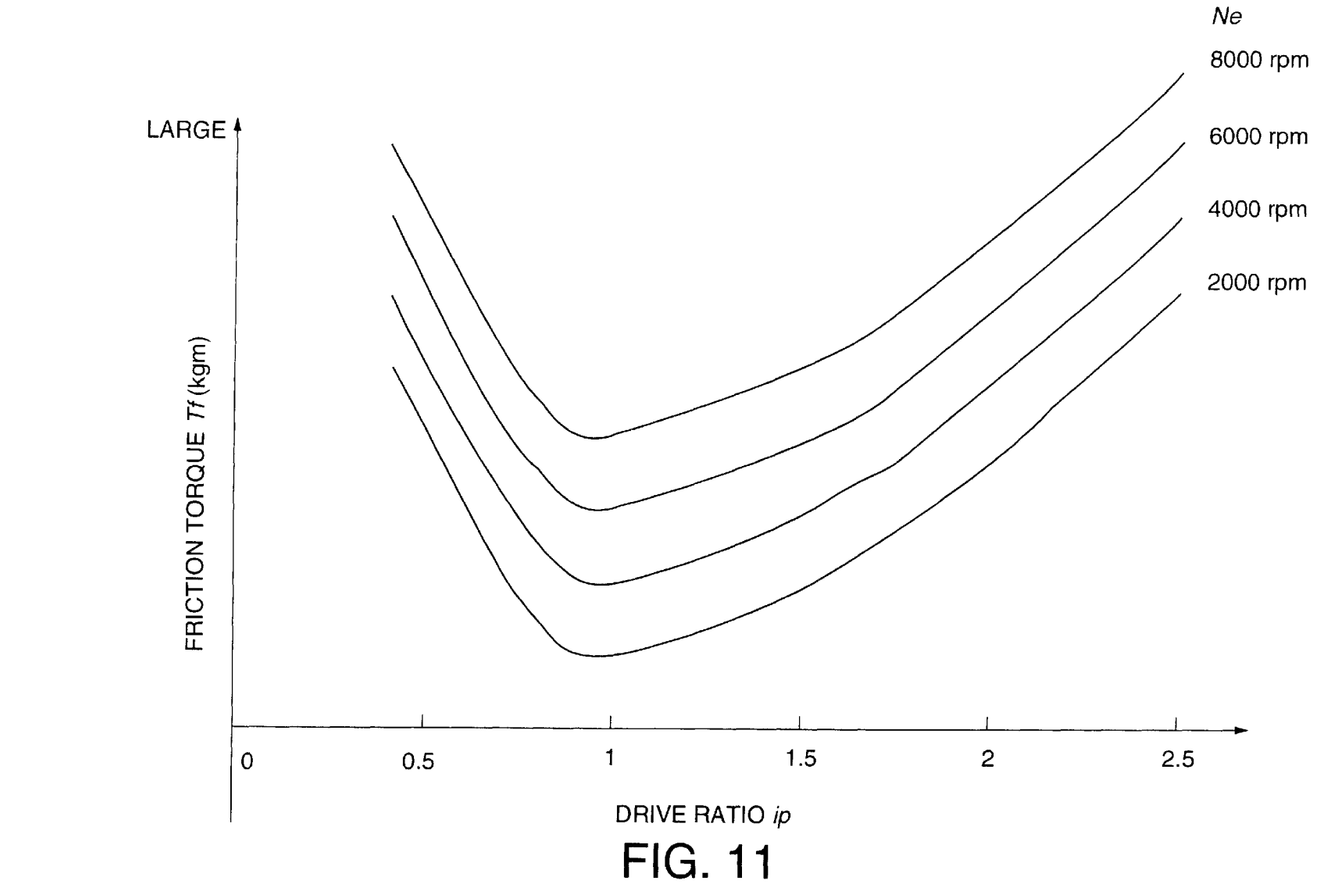
FIG. 11 is a diagram describing the contents of a transmission friction torque computing map stored by the controller according to the second embodiment.

At the same time, the motor /generator controller 76 calculates a frictional torque Tf of the continuously variable transmission 30 by looking up a map shown in FIG. 11 based on the real drive ratio ip of the continuously variable transmission 30 input from the transmission controller 75 and the engine rotation speed Ne.

The motor/generator controller 76 calculates an engine braking force EB by adding the frictional torque Tf to the coasting torque Tec found in this way.

In the following step S24, it is determined whether or not the engine braking force EB is equal to or greater than a threshold value EBTH. This threshold value EBTH is a value showing an upper limit of the engine braking force at which the grip of the drive wheels on the road surface is not lost. When EB<EBTH, there is no risk that the engine braking force will cause the vehicle wheels to lock, so the subroutine is terminated.

On the other hand, when EB≧EBTH, the routine proceeds to a step S25, and the motor /generator controller 76 causes the motor /generator 26 to function as a motor so that a torque equivalent to the difference between the engine braking force EB and the threshold value EBTH acts on the drive wheels.

For this purpose, a map specifying the relation between the difference between the engine braking force EB and the threshold value EBTH, and a target current value required to generate a torque to compensate this difference, is previously stored in the motor/generator controller 76. In the step S25, the target current value is found by looking up this map. After supplying the obtained target current value to the motor/generator 26 via the motor/generator drive circuit 74, the subroutine is terminated.

According to this embodiment, an engine braking force exceeding the threshold value is not applied while the wheel cylinders are being depressurized due to ABS control. Therefore, even if the drive ratio varies in the maximum direction, wheel lock does not occur, and the vehicle can be restarted with the maximum drive ratio without impairing ABS performance as in the case of the aforesaid first embodiment.

In the above embodiments, a V-belt continuously variable transmission was used, but this invention may also be applied to a vehicle using a toroidal continuously variable transmission.

In the aforesaid embodiments, the motor /generator 26 was used, but this invention may be applied also to a drive device comprising a separate generator and motor. Further, the vehicle can be restarted with the maximum drive ratio without decreasing ABS performance even when the invention is applied to a drive device with only a motor combined with the engine instead of the motor/generator 26.

Instead of connecting to the input shaft of the continuously variable transmission 30, the motor/generator 26 may also be connected to the output shaft of the continuously variable transmission 30. Further, instead of connecting the motor/generator 26 directly to the input shaft or output shaft, it may be connected to the input shaft or output shaft via a transmission member such as a gear or a belt.

Further, all or some of the engine controller 70, transmission controller 75, motor/generator controller 76 and ABS controller 80 may be implemented by one microcomputer.

The embodiments of this invention in which an exclusive property or privilege is claimed are defined as follows. The corresponding structures, materials, acts, and equivalents of all step plus function elements in the claims below are intended to include any structure, material, or acts for performing the functions in combination with other claimed elements as specifically claimed.

What is claimed:

1. A controller for a vehicle drive system wherein an engine and a motor are connected to a drive wheel via a continuously variable transmission which increases a drive ratio according to a decrease of a rotation speed of said drive wheel, said vehicle comprising an accelerator pedal for increasing an output torque of said engine according to a depression thereof, while said engine exerts an engine brake on said drive wheel when said accelerator pedal has been released, a brake device for applying a braking pressure to said drive wheel, and an antilock brake system which decreases said braking pressure so as to prevent said drive wheel from locking, said vehicle drive system controller comprising:

a first microprocessor programmed to:
  determine if said antilock brake system is decreasing said braking pressure, and
  control said drive system so that the rotation torque of said motor is applied to said drive wheel when said antilock brake system is decreasing said braking pressure.

2. A vehicle drive system controller as defined in claim 1, wherein said motor comprises a motor/generator permanently connected to said drive wheel which functions as a motor when power is supplied and which functions as a generator when a rotation torque is supplied, and an electrical circuit for changing over between the generator function and the motor function of said motor/generator, and said first microprocessor is further programmed to control said electrical circuit so that said motor igenerator functions as a motor when said antilock brake system is decreasing said braking pressure.

3. A vehicle drive system controller as defined in claim 1, wherein said antilock brake system comprises a microprocessor programmed to calculate a real vehicle running speed and a drive wheel speed, and said first microprocessor of said vehicle drive system controller is further programmed to calculate a rotation torque of said motor so that a difference between said real vehicle running speed and said drive wheel speed coincides with a preset target value, and to control said motor to generate said calculated rotation torque.

4. A vehicle drive system controller as defined in claim 1, wherein said engine comprises a throttle for regulating an intake air amount according to an opening thereof which varies according to the depression of said accelerator pedal, said vehicle drive system controller further comprises a second microprocessor programmed to control the opening of said throttle, a sensor for detecting a rotation speed of said engine and a sensor for detecting the drive ratio of said continuously variable transmission, and said first microprocessor of said vehicle drive system controller is further programmed to calculate an engine braking force based on the opening of said throttle, said engine rotation speed and said drive ratio, and to control said drive system so that the rotation torque of said motor is applied to said drive wheel when said antilock brake system is decreasing said braking pressure and said engine braking force is larger than a predetermined threshold value.

5. A vehicle drive system controller as defined in claim 4, wherein said first microprocessor of said vehicle drive system controller is further programmed to control said vehicle drive system so that said motor applies a rotation torque equivalent to the difference between the engine braking force and the threshold value to said drive wheel.

6. A control method for a vehicle drive system wherein an engine and a motor are connected to a drive wheel via a continuously variable transmission which increases a drive ratio according to a decrease of a rotation speed of said drive wheel, said vehicle comprising an accelerator pedal for increasing an output torque of said engine according to a depression thereof, while said engine exerts an engine brake on said drive wheel when said accelerator pedal has been released, a brake device for applying a braking pressure to said drive wheel, and an antilock brake system which decreases said braking pressure so as to prevent said drive wheel from locking, said control method comprising the steps of:

determining if said antilock brake system is decreasing said braking pressure, and     applying the rotation torque of said motor to said drive wheel when said antilock brake system is decreasing said braking pressure.

* * * * *